United States Patent
Gormley

(10) Patent No.: US 11,754,018 B2
(45) Date of Patent: Sep. 12, 2023

(54) AIRCRAFT PROPULSION SYSTEM EXHAUST NOZZLE WITH EJECTOR PASSAGE(S)

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/554,695

(22) Filed: Dec. 17, 2021

(65) Prior Publication Data
US 2023/0193852 A1    Jun. 22, 2023

(51) Int. Cl.
| | | |
|---|---|---|
| F02K 1/12 | (2006.01) | |
| F02K 1/36 | (2006.01) | |
| F02K 1/38 | (2006.01) | |
| F02K 1/46 | (2006.01) | |
| F02K 1/15 | (2006.01) | |

(52) U.S. Cl.
CPC ............ *F02K 1/1215* (2013.01); *F02K 1/123* (2013.01); *F02K 1/36* (2013.01); *F02K 1/38* (2013.01); *F02K 1/46* (2013.01); *F02K 1/15* (2013.01); *F05D 2250/323* (2013.01); *F05D 2250/324* (2013.01); *F05D 2260/56* (2013.01)

(58) Field of Classification Search
CPC ... F02K 1/123; F02K 1/46; F02K 1/15; F02K 1/1215; F02K 1/36; F02K 1/70; F02K 1/72; F05D 2250/323; F05D 2250/324; F05D 2260/56

See application file for complete search history.

(56) References Cited

U.S. PATENT DOCUMENTS

| | | | | |
|---|---|---|---|---|
| 2,972,860 | A | | 2/1961 | Moy |
| 3,409,228 | A | * | 11/1968 | Mehr ...................... F02K 1/123 239/265.17 |
| 3,610,533 | A | * | 10/1971 | Johnson ................ F02K 1/1215 239/265.19 |
| 3,722,797 | A | * | 3/1973 | Hammill ................... F02K 1/36 239/265.17 |
| 3,747,855 | A | | 7/1973 | Vdoviak |
| 3,973,731 | A | | 8/1976 | Thayer |
| 4,805,840 | A | | 2/1989 | Tape |
| 5,470,020 | A | | 11/1995 | Brossier |
| 5,826,794 | A | | 10/1998 | Rudolph |
| 5,884,843 | A | | 3/1999 | Lidstone |
| 2004/0195443 | A1 | * | 10/2004 | Lair ......................... F02K 1/70 244/110 B |

(Continued)

*Primary Examiner* — Andrew H Nguyen
(74) *Attorney, Agent, or Firm* — GETZ BALICH LLC

(57) ABSTRACT

An apparatus is provided for an aircraft propulsion system. This apparatus includes an exhaust nozzle. The exhaust nozzle includes a flowpath, a passage, an outer door, an inner door and an actuator configured to move the outer door and the inner door between an open arrangement and a closed arrangement. The flowpath extends axially along a centerline through the exhaust nozzle. The passage extends laterally into the exhaust nozzle to the flowpath when the outer door and the inner door are in the open arrangement. The outer door is configured to pivot inwards towards the centerline when the outer door moves from the closed arrangement to the open arrangement. The inner door is configured to pivot outwards away from the centerline when the inner door moves from the closed arrangement to the open arrangement.

20 Claims, 9 Drawing Sheets

(56) References Cited

U.S. PATENT DOCUMENTS

| | | | |
|---|---|---|---|
| 2010/0072324 A1* | 3/2010 | Teulou | F02K 1/763 60/226.2 |
| 2016/0040627 A1* | 2/2016 | Zsurka | B64D 33/04 415/211.2 |
| 2018/0094605 A1 | 4/2018 | Rosenau | |
| 2018/0258881 A1* | 9/2018 | Schaefer | F02K 1/60 |

* cited by examiner

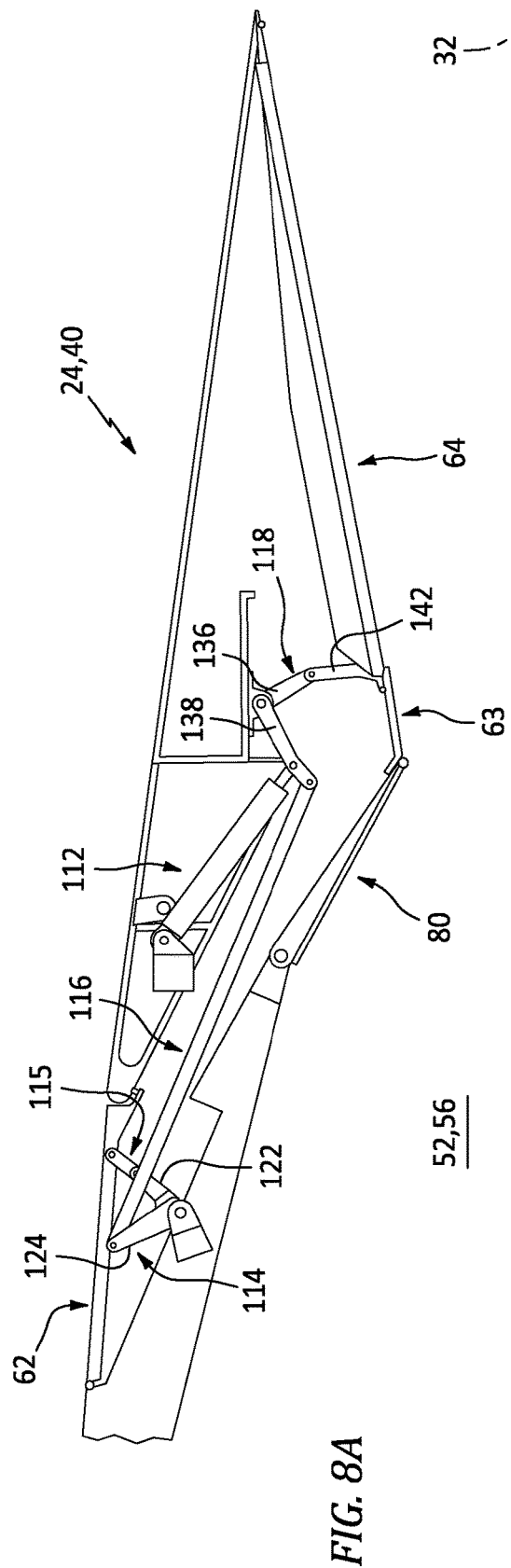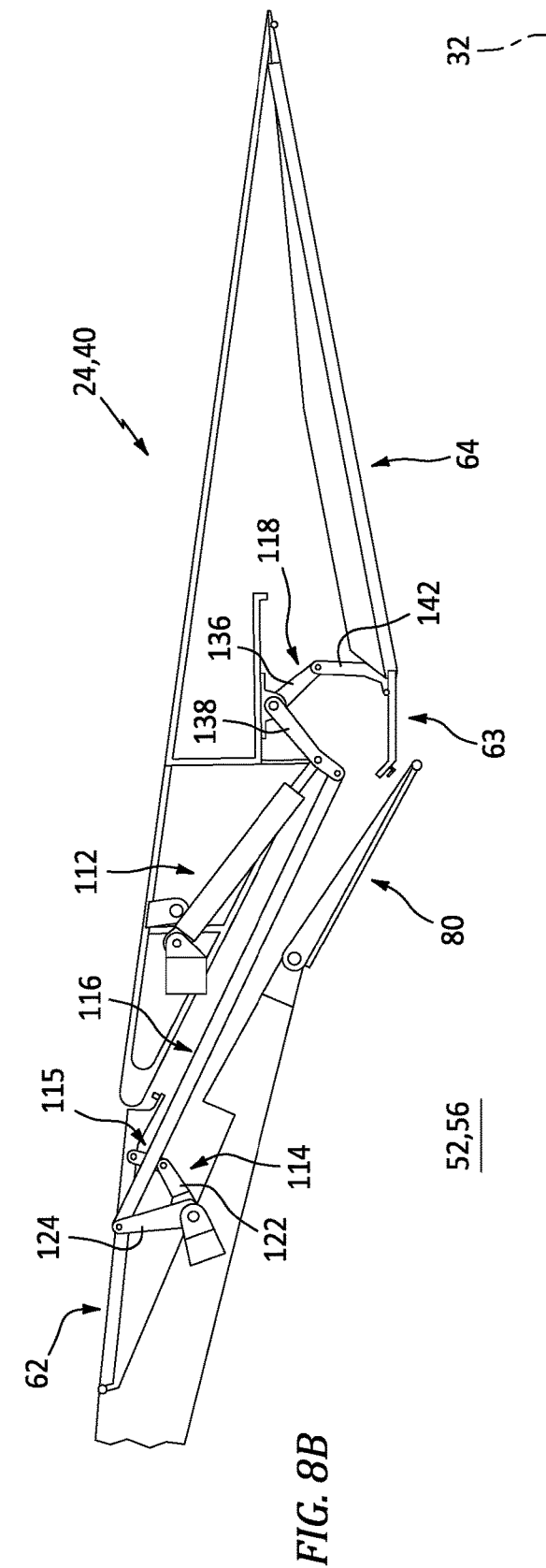

AIRCRAFT PROPULSION SYSTEM EXHAUST NOZZLE WITH EJECTOR PASSAGE(S)

BACKGROUND

1. Technical Field

This disclosure relates generally to an aircraft propulsion system and, more particularly, to an exhaust nozzle.

2. Background Information

An exhaust nozzle for an aircraft propulsion system may include an ejector for introducing supplemental air (e.g., ambient air from outside of the aircraft propulsion system) into a low pressure region of the exhaust nozzle. Various types and configurations of exhaust nozzles with ejectors are known in the art. While these known exhaust nozzles have various advantages, there is still room in the art for improvement. There is a need in the art therefore for an improved exhaust nozzle with an ejector.

SUMMARY OF THE DISCLOSURE

According to an aspect of the present disclosure, an apparatus is provided for an aircraft propulsion system. This apparatus includes an exhaust nozzle. The exhaust nozzle includes a flowpath, a passage, an outer door, an inner door and an actuator configured to move the outer door and the inner door between an open arrangement and a closed arrangement. The flowpath extends axially along a centerline through the exhaust nozzle. The passage extends laterally into the exhaust nozzle to the flowpath when the outer door and the inner door are in the open arrangement. The outer door is configured to pivot inwards towards the centerline when the outer door moves from the closed arrangement to the open arrangement. The inner door is configured to pivot outwards away from the centerline when the inner door moves from the closed arrangement to the open arrangement.

According to another aspect of the present disclosure, another apparatus is provided for an aircraft propulsion system. This apparatus includes an exhaust nozzle. The exhaust nozzle includes a flowpath, a passage, an outer door, an inner door and a linkage system motively coupling the outer door to the inner door. The flowpath extends axially within the exhaust nozzle to an outlet orifice at a trailing edge of the exhaust nozzle. The passage extends laterally through a sidewall structure of the exhaust nozzle between an outer passage orifice and an inner passage orifice adjacent the flowpath. The outer door is configured to open and close the outer passage orifice. The outer door forms an inner peripheral boundary for flow outside of the exhaust nozzle when the outer passage orifice is closed. The inner door is configured to open and close the inner passage orifice. The inner door forms an outer peripheral boundary of the flowpath when the inner passage orifice is closed.

According to still another aspect of the present disclosure, another apparatus is provided for an aircraft propulsion system. This apparatus includes an exhaust nozzle. The exhaust nozzle includes an exhaust flowpath, an ejector passage and a door assembly configured to move between a closed arrangement and an open arrangement. The ejector passage is fluidly decoupled from the exhaust flowpath when the door assembly is in the closed arrangement. The ejector passage is fluidly coupled with the exhaust flowpath when the door assembly is in the open arrangement. The door assembly includes an outer door, a forward inner door and an aft inner door pivotally connected to and moveable with the forward inner door. The outer door is configured to pivot to open and close an inlet into the ejector passage. The forward inner door is configured to pivot to open and close an outlet from the ejector passage into the exhaust flowpath.

The apparatus may also include an actuator configured to move the outer door and the inner door through the linkage system.

The apparatus may also include an actuator motively coupled with the outer door, the forward inner door and the aft inner door.

The outer door may be configured to pivot inward towards the centerline as the outer door opens the inlet into the ejector passage. The forward inner door and the aft inner door may be configured to pivot outwards away from the centerline as the forward inner door opens the outlet from the ejector passage into the exhaust flowpath.

The exhaust nozzle may be configured as or otherwise include a convergent-divergent nozzle.

The exhaust nozzle may be configured as or otherwise include an ejector nozzle.

The actuator may be configured as or otherwise include a linear actuator.

The exhaust nozzle may also include a linkage system motively coupling the actuator to the outer door and the inner door.

The linkage system may include a pushrod.

The linkage system may include a crank.

The exhaust nozzle may also include a base structure, an outer crank and an outer linkage. The outer crank may include an outer crank base, an outer crank first arm and an outer crank second arm. The outer crank base may be pivotally connected to the base structure. The outer crank first arm and the outer crank second arm may each project out from the outer crank base. The outer linkage may be between and/or pivotally connected to the outer crank first arm and the outer door. The actuator may be motively coupled with the outer crank second arm.

The exhaust nozzle may also include a base structure and an inner crank. The inner crank may include an inner crank base, an inner crank first arm and an inner crank second arm. The inner crank base may be pivotally connected to the base structure. The inner crank first arm may project out from the base and/or may be pivotally connected to the inner door. The inner crank second arm may project out from the base and/or may be pivotally connected to the actuator.

The exhaust nozzle may also include an outer crank, an outer linkage and an intermediate linkage. The outer crank may include an outer crank base, an outer crank first arm and an outer crank second arm. The outer crank base may be pivotally connected to the base structure. The outer crank first arm and the outer crank second arm may each project out from the outer crank base. The outer linkage may be between and/or pivotally connected to the outer crank first arm and the outer door. The intermediate linkage may be between and/or pivotally connected to the outer crank second arm and the inner crank second arm.

The outer door may be configured to pivot between the closed arrangement and the open arrangement about an outer door pivot connection at a forward end of the outer door.

The inner door may be configured to pivot between the closed arrangement and the open arrangement about an inner door pivot connection at an aft end of the inner door.

The inner door may include a forward inner door. The exhaust nozzle may also include an aft inner door pivotally connected to the forward inner door. The actuator may also be configured to move the aft inner door between the open arrangement and the closed arrangement. The aft inner door may be configured to pivot outwards away from the centerline when the aft inner door moves from the closed arrangement to the open arrangement.

The outer door may form an inner peripheral boundary for flow outside of the exhaust nozzle when the outer door is in the closed arrangement. In addition or alternatively, the forward inner door and the aft inner door may form an outer peripheral boundary of the flowpath when the forward inner door and the aft inner door are in the closed arrangement.

The outer door may close an inlet to the passage when the outer door is in the closed arrangement. The inner door may close an outlet from the passage when the inner door is in the closed arrangement.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 8A-D are a sequence of partial sectional illustrations of the exhaust nozzle depicting opening of an ejector passage.

DETAILED DESCRIPTION

Figure 1:
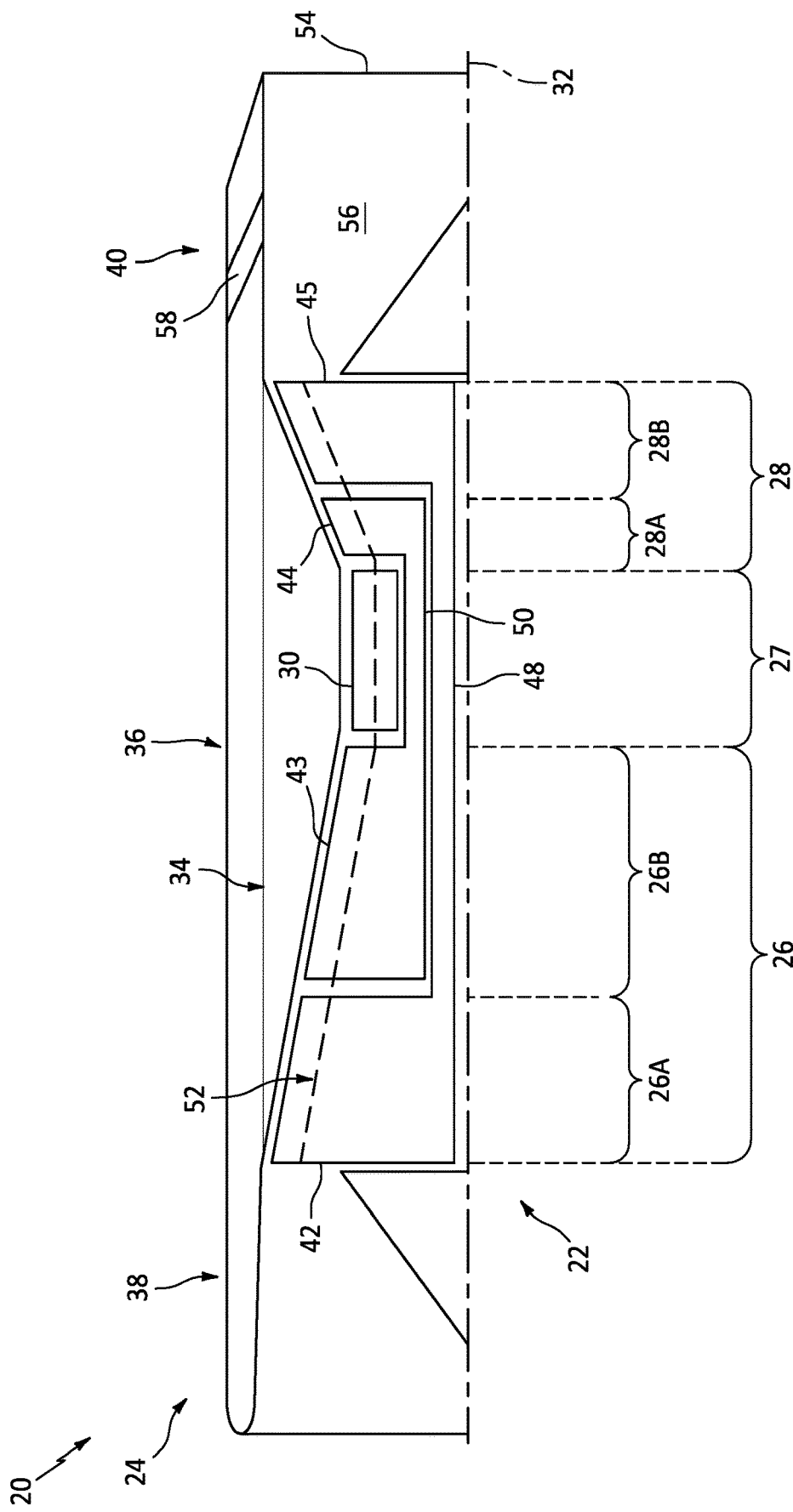
FIG. 1 is a partial schematic illustration of an aircraft propulsion system.

FIG. 1 illustrates an aircraft propulsion system 20 for an aircraft; e.g., a jet plane. This aircraft propulsion system 20 includes a gas turbine engine 22 and an aircraft propulsion system housing 24.

The gas turbine engine 22 may be configured as a turbojet engine, or any other type of gas turbine engine such as a turbofan engine. The gas turbine engine 22 of FIG. 1, for example, includes a compressor section 26, a combustor section 27 and a turbine section 28. The compressor section 26 may include a low pressure compressor (LPC) section 26A and a high pressure compressor (HPC) section 26B. The combustor section 27 includes a combustor 30. The turbine section 28 may include a high pressure turbine (HPT) section 28A and a low pressure turbine (LPT) section 28B.

The engine sections 26A-28B are arranged sequentially along an axial centerline 32 (e.g., a rotational axis) of the gas turbine engine 22 within the aircraft propulsion system housing 24. This aircraft propulsion system housing 24 includes an engine case 34 and a nacelle 36. The engine case 34 houses one or more of the engine sections 26A-28B, which engine sections 26A-28B may be collectively referred to as an engine core. The nacelle 36 houses and provides an aerodynamic cover for the engine case 34. The aircraft propulsion system housing 24 of FIG. 1 also forms an upstream, forward airflow inlet structure 38 and a downstream, aft exhaust nozzle 40 for the aircraft propulsion system 20.

Each of the engine sections 26A, 26B, 28A and 28B includes a bladed rotor 42-45. Each of these bladed rotors 42-45 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The LPC rotor 42 is connected to and driven by the LPT rotor 45 through a low speed shaft 48. The HPC rotor 43 is connected to and driven by the HPT rotor 44 through a high speed shaft 50. The shafts 48 and 50 are rotatably supported by a plurality of bearings (not shown). Each of these bearings is connected to the aircraft propulsion system housing 24 and its engine case 34 by at least one stationary structure such as, for example, an annular support frame.

During operation, air enters the aircraft propulsion system 20 through the inlet structure 38 and is directed into a core flowpath 52. The core flowpath 52 extends axially along the axial centerline 32 within the aircraft propulsion system 20. More particularly, the core flowpath 52 extends axially through the engine sections 26A-28B and the exhaust nozzle 40 to an aft outlet orifice 54 of the exhaust nozzle 40. The air within the core flowpath 52 may be referred to as "core air".

The core air is compressed by the LPC rotor 42 and the HPC rotor 43, and directed into a combustion chamber of the combustor 30. Fuel is injected into the combustion chamber and mixed with the compressed core air to provide a fuel-air mixture. This fuel-air mixture is ignited and combustion products thereof flow through and sequentially cause the HPT rotor 44 and the LPT rotor 45 to rotate. The rotation of the HPT rotor 44 and the LPT rotor 45 respectively drive rotation of the HPC rotor 43 and the LPC rotor 42 and, thus, compression of the air received through the inlet structure 38. The aircraft propulsion system 20 of the present disclosure, however, is not limited to the exemplary gas turbine engine configuration described above.

Under certain operating conditions, it may be beneficial to provide variability at the exhaust nozzle 40 to enhance aircraft propulsion system operation. To provide such variability, the exhaust nozzle 40 may be configured as a convergent-divergent ejector nozzle. The exhaust nozzle 40 of FIG. 1, for example, is configured to selectively direct supplemental air (e.g., ambient air from outside of the aircraft propulsion system 20) into a low pressure region of the core flowpath 52 within the exhaust nozzle 40. Introduction of this supplemental air may energize a relatively slow, outer stream of the combustion products flowing through the core flowpath 52 and thereby enhance overall engine thrust.

Figure 2:
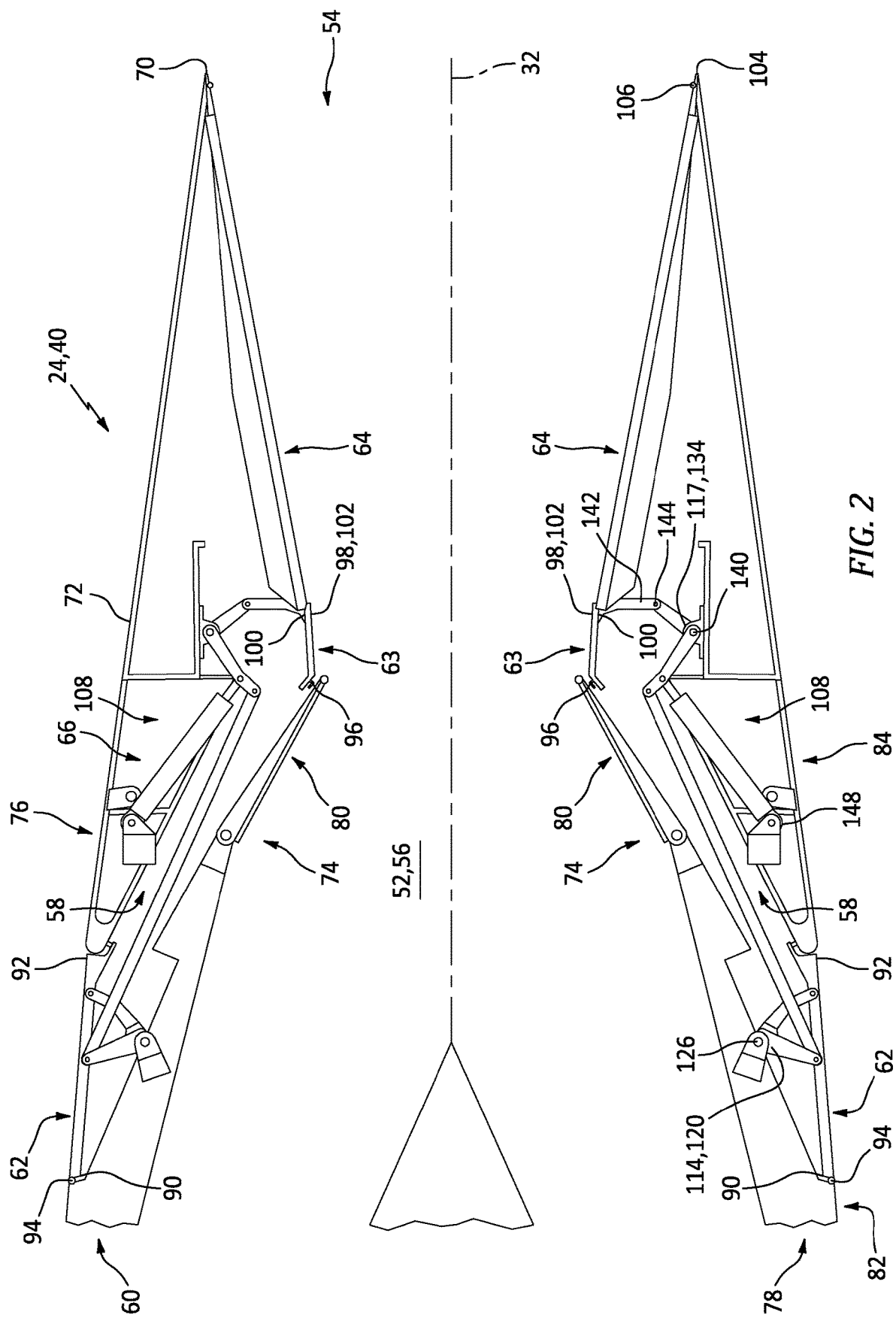
FIG. 2 is a partial sectional illustration of an exhaust nozzle in a first arrangement with its ejector passages closed.
Figure 3:
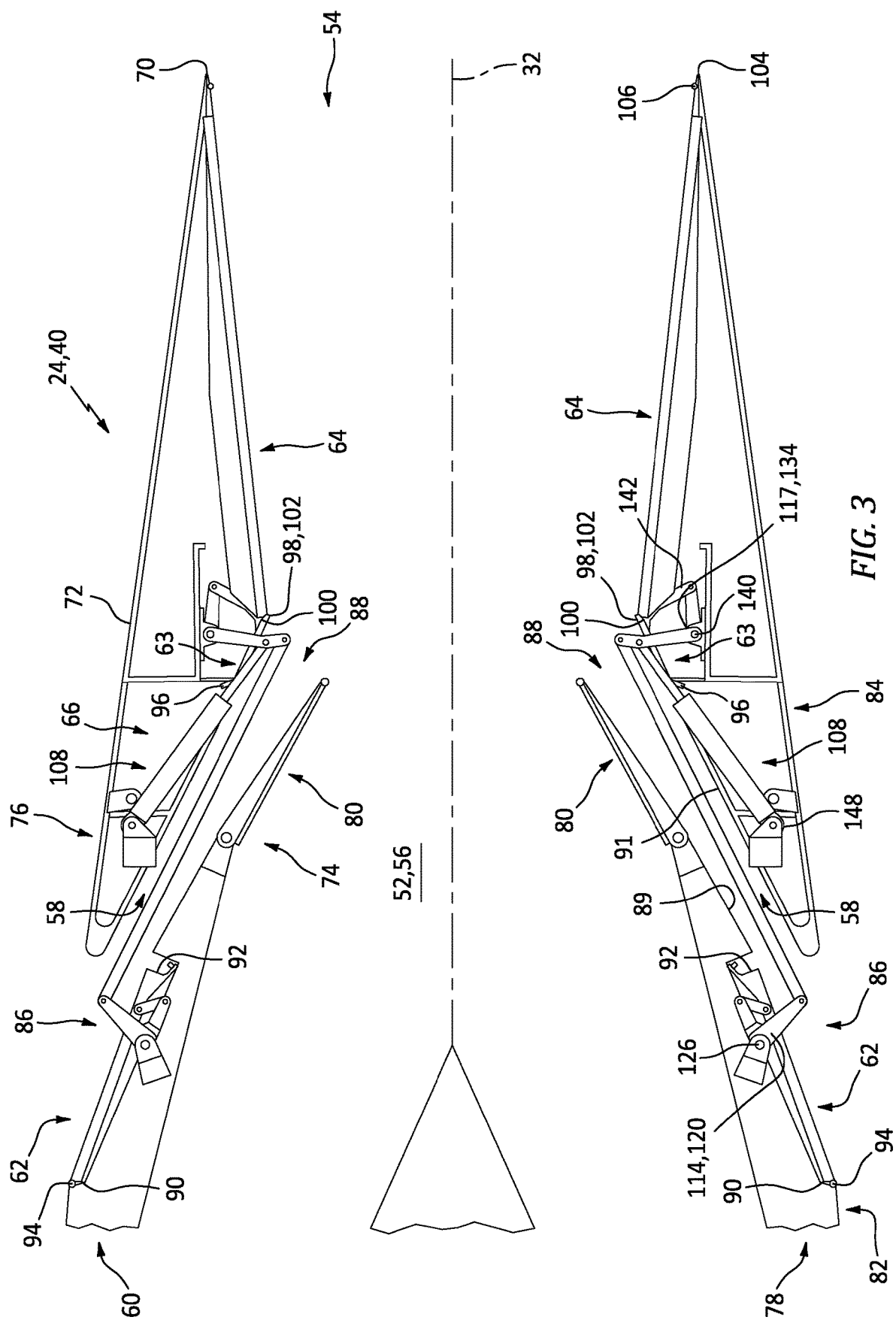
FIG. 3 is a partial sectional illustration of the exhaust nozzle in a second arrangement with its ejector passages open.

The exhaust nozzle 40 of FIGS. 2 and 3 is configured with a central exhaust flowpath 56 and one or more outer ejector passages 58 (see FIG. 3), where the exhaust flowpath 56 may be an aft, downstream section of the core flowpath 52 within the exhaust nozzle 40. The exhaust nozzle 40 of FIGS. 2 and 3 includes a nozzle base structure 60, one or more nozzle outer doors 62, one or more nozzle upstream, forward inner doors 63 and one or more nozzle downstream, aft inner doors 64. This exhaust nozzle 40 also includes a nozzle actuator system 66 for moving the nozzle doors 62-64.

Figure 4:
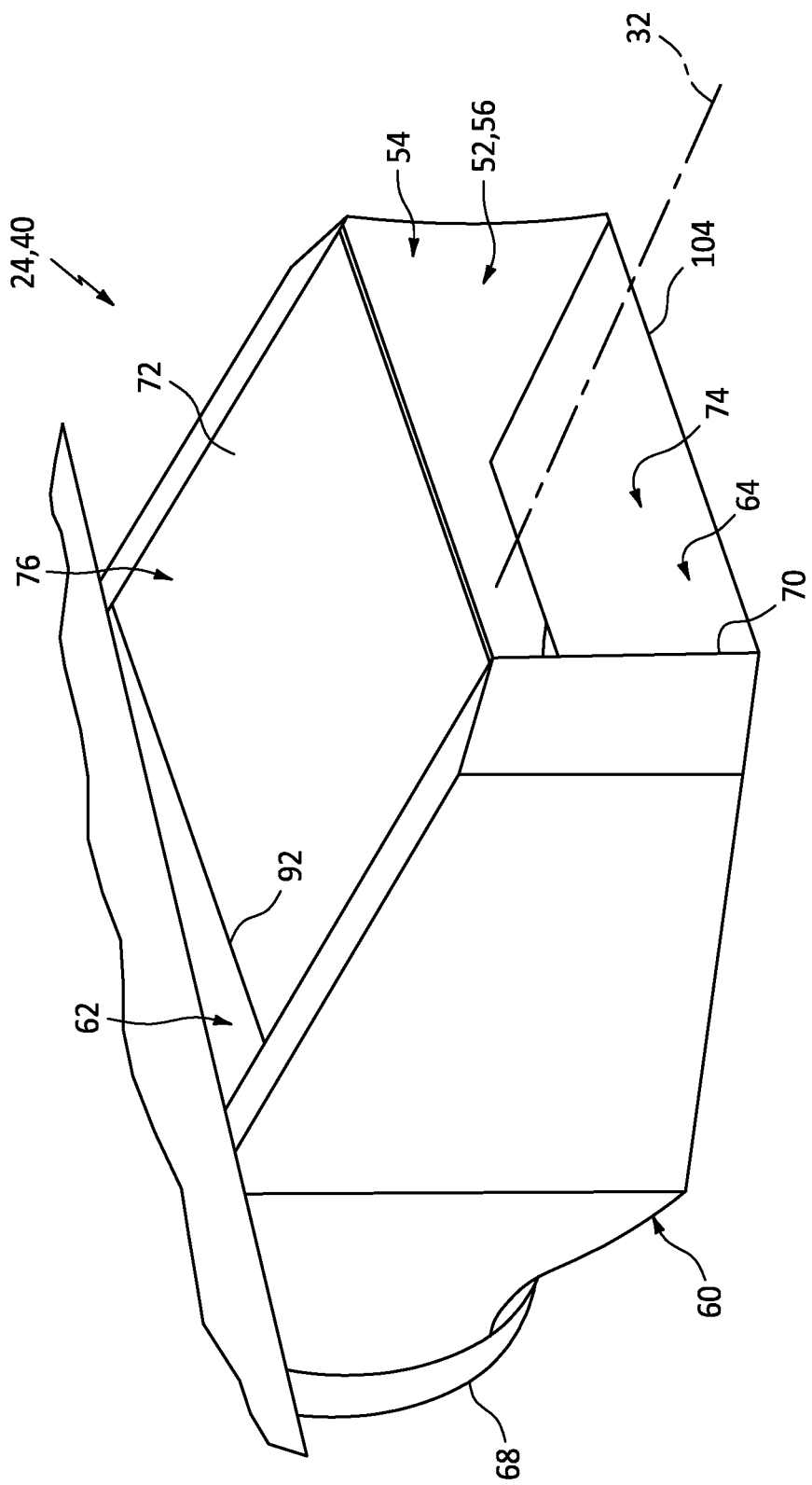
FIG. 4 is a partial perspective illustration of the exhaust nozzle with an aircraft wing.

Referring to FIG. 4, the base structure 60 extends axially along the axial centerline 32 from an upstream, forward end 68 of the exhaust nozzle 40 to a downstream, aft end 70 of the exhaust nozzle 40; e.g., a trailing edge of the exhaust nozzle 40. The base structure 60 of FIG. 4 has a polygonal (e.g., rectangular) tubular body with a nozzle sidewall structure 72 that extends (e.g., circumferentially) about the axial centerline 32. Referring to FIGS. 2 and 3, the base structure 60 and its sidewall structure 72 extend laterally (e.g., in a radial direction in FIGS. 2 and 3) between and to a lateral inner side 74 of the exhaust nozzle 40 and a lateral outer side 76 of the exhaust nozzle 40, where the nozzle inner side 74 forms an outer peripheral boundary of the exhaust flowpath 56 through the exhaust nozzle 40 to the nozzle outlet orifice 54, and where the nozzle outer side 76 forms an inner peripheral boundary for flow (e.g., ambient boundary layer air) outside of the exhaust nozzle 40.

The base structure 60 of FIGS. 2 and 3 includes a fixed structure 78 and one or more restrictors 80; e.g., divergent nozzle flaps. An upstream, forward section 82 of the fixed structure 78 forms an upstream, forward portion of the nozzle inner side 74 and an upstream, forward portion of the nozzle outer side 76. A downstream, aft section 84 of the fixed structure 78 forms a downstream, aft portion of the nozzle outer side 76 which extends to the nozzle aft end 70. The restrictors 80 are arranged on opposing (e.g., upper and lower) sides of the axial centerline 32 and respectively form intermediate portions of the nozzle inner side 74. Each of the restrictors 80 is movably coupled with the fixed structure 78. Each of the restrictors 80 of FIGS. 2 and 3, for example, is pivotally connected to the structure forward section 82. These restrictors 80 are configured to pivot inward towards and outward away from the axial centerline 32 in order to tune the flow of combustion products directed through the exhaust nozzle 40. However, these restrictors 80 are typically stationary (not moved) during operation of the ejector functionality of the exhaust nozzle 40.

Each of the ejector passages 58 extend laterally and/or axially (e.g., diagonally) into the exhaust nozzle 40 to the exhaust flowpath 56. Each ejector passage 58 of FIG. 3, for example, extends through the sidewall structure 72 of the exhaust nozzle 40 between and to an outer inlet orifice 86 to the respective ejector passage 58 and an inner outlet orifice 88 from the respective ejector passage 58. The passage inlet orifice 86 is located at the nozzle outer side 76. The passage outlet orifice 88 is located at the nozzle inner side 74 along the exhaust flowpath 56. Each ejector passage 58 extends within the sidewall structure 72 axially along the axial centerline 32 between and to an upstream, forward side 89 (relative to flow through the exhaust flowpath 56) of the respective ejector passage 58 and a downstream, aft side 91 (relative to flow through the exhaust flowpath 56) of the respective ejector passage 58. The passage forward side 89 of FIG. 3 is formed by the structure forward section 82 and a respective one of the restrictors 80 as well as the outer doors 62. The passage aft side 91 of FIG. 3 is formed by the structure aft section 84 and a respective one of the nozzle forward inner doors 63.

The nozzle outer doors 62 of FIGS. 2 and 3 are arranged on opposing (e.g., upper and lower, left and right hand sides if turned 90°, etc.) sides of the axial centerline 32. Each nozzle outer door 62 extends longitudinally between an upstream, forward end 90 of the respective nozzle outer door 62 and a downstream, aft end 92 of the respective nozzle outer door 62. Each nozzle outer door 62 is moveably coupled with the base structure 60. Each nozzle outer door 62 of FIGS. 2 and 3, for example, is pivotally connected to the fixed structure 78 and its structure forward section 82 through a pivot connection 94 (e.g., a hinge connection, a pin connection, etc.) at the outer door forward end 90. Each nozzle outer door 62 may thereby pivot laterally inward towards the axial centerline 32 from an outer door closed position (see FIG. 2) to an outer door open position (see FIG. 3), and vice versa. Referring to FIG. 2, each nozzle outer door 62 is in its closed position when the exhaust nozzle 40 is in a first arrangement/a first mode of operation; e.g., when the ejector functionality is not in use. Referring to FIG. 3, each nozzle outer door 62 is in its open position when the exhaust nozzle 40 is in a second arrangement/a second mode of operation; e.g., when the ejector functionality is in use.

The nozzle forward inner doors 63 of FIGS. 2 and 3 are arranged on opposing (e.g., upper and lower) sides of the axial centerline 32. Each nozzle forward inner door 63 extends longitudinally between an upstream, forward end 96 of the respective nozzle forward inner door 63 and a downstream, aft end 98 of the respective nozzle forward inner door 63. Each nozzle forward inner door 63 is movably coupled with a respective one of the nozzle aft inner doors 64. Each nozzle forward inner door 63 of FIGS. 2 and 3, for example, is pivotally connected to the respective nozzle aft inner door 64 through a pivot connection 100 (e.g., a hinge connection, a pin connection, etc.) at the forward inner door aft end 98 and an upstream, forward end 102 of the respective nozzle aft inner door 64. Each nozzle forward inner door 63 may thereby pivot laterally outwards away from the axial centerline 32 from a forward inner door closed position (see FIG. 2) to a forward inner door open position (see FIG. 3), and vice versa. Referring to FIG. 2, each nozzle forward inner door 63 is in its closed position when the exhaust nozzle 40 is in the first arrangement/the first mode of operation. Referring to FIG. 3, each nozzle forward inner door 63 is in its open position when the exhaust nozzle 40 is in the second arrangement/the second mode of operation.

The nozzle aft inner doors 64 of FIGS. 2 and 3 are arranged on opposing (e.g., upper and lower) sides of the axial centerline 32. Each nozzle aft inner door 64 extends longitudinally between its aft inner door forward end 102 and a downstream, aft end 104 of the respective nozzle aft inner door 64. Each nozzle aft inner door 64 is movably coupled with the base structure 60. Each nozzle aft inner door 64 of FIGS. 2 and 3, for example, is pivotally connected to the fixed structure 78 and its structure aft section 84 through a pivot connection 106 (e.g., a hinge connection, a pin connection, etc.) at the aft inner door aft end 104 and at the nozzle aft end 70. Each nozzle aft inner door 64 may thereby pivot laterally outwards away from the axial centerline 32 from an aft inner door closed position (see FIG. 2) to an aft inner door open position (see FIG. 3), and vice versa. Referring to FIG. 2, each nozzle aft inner door 64 is in its closed position when the exhaust nozzle 40 is in the first arrangement/the first mode of operation. Referring to FIG. 3, each nozzle aft inner door 64 is in its open position when the exhaust nozzle 40 is in the second arrangement/the second mode of operation. A size (e.g., a minimum lateral height) of the exhaust flowpath 56 within the exhaust nozzle 40 along the nozzle aft inner doors 64 is thereby greater in in the second arrangement/the second mode of operation (see FIG. 3) than in the first arrangement/the first mode of operation (see FIG. 2).

Figure 5:
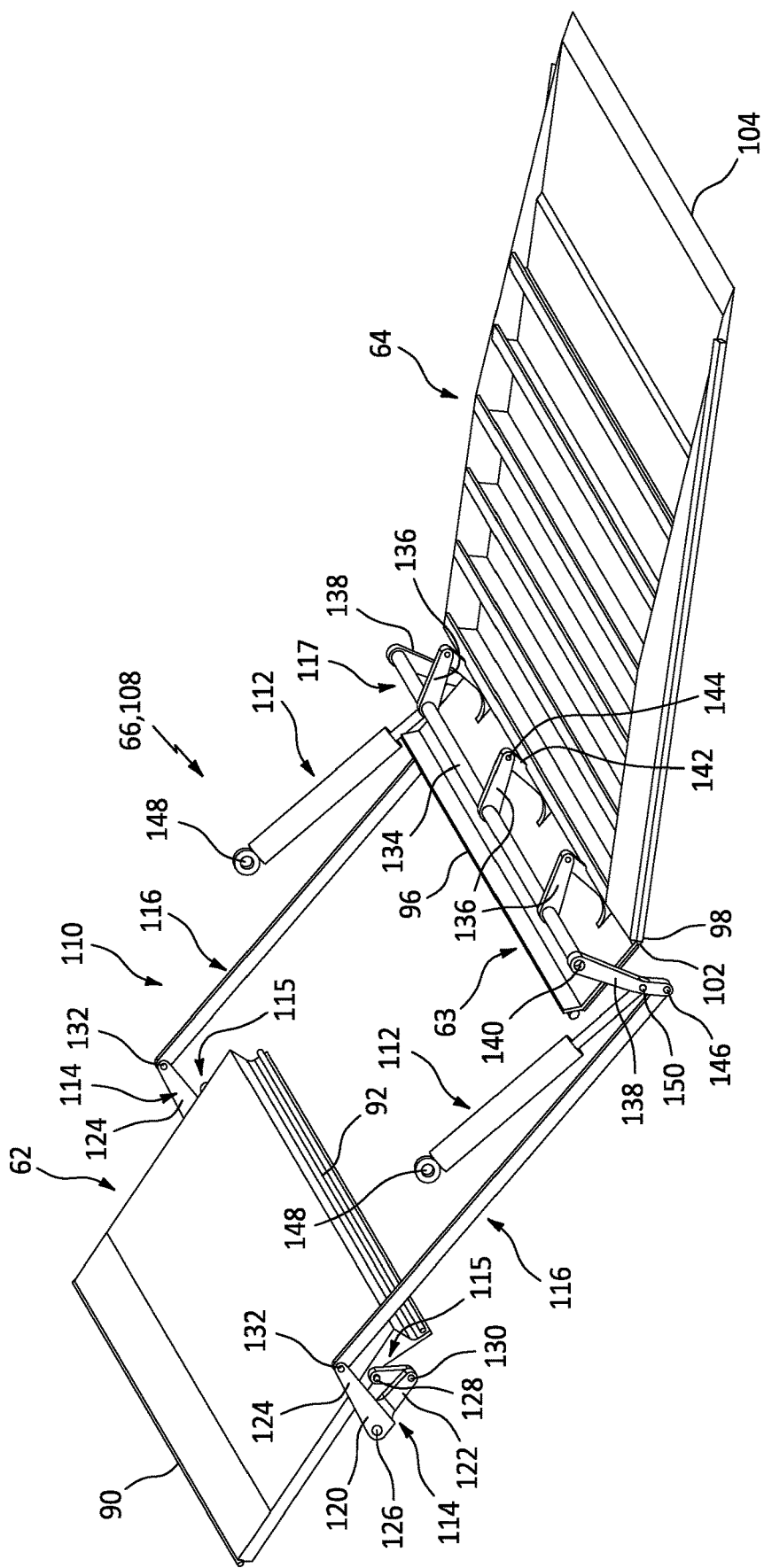
FIG. 5 is a perspective illustration of an actuator assembly configured with a set of nozzle doors.

The nozzle actuator system 66 of FIGS. 2 and 3 includes a plurality of actuator assemblies 108. The actuator assemblies 108 are arranged on opposing (e.g., upper and lower)

sides of the axial centerline 32, where each actuator assembly 108 is associated with a respective one of the nozzle outer doors 62, a respective one of the nozzle forward inner doors 63 and a respective one of the nozzle aft inner doors 64. Referring to FIG. 5, each actuator assembly 108 includes a linkage system 110 and one or more actuators 112. The linkage system 110 of FIG. 5 includes one or more outer cranks 114, one or more outer linkages 115, one or more intermediate (e.g., tie) linkages 116 and at least one inner crank 117.

Figure 6:
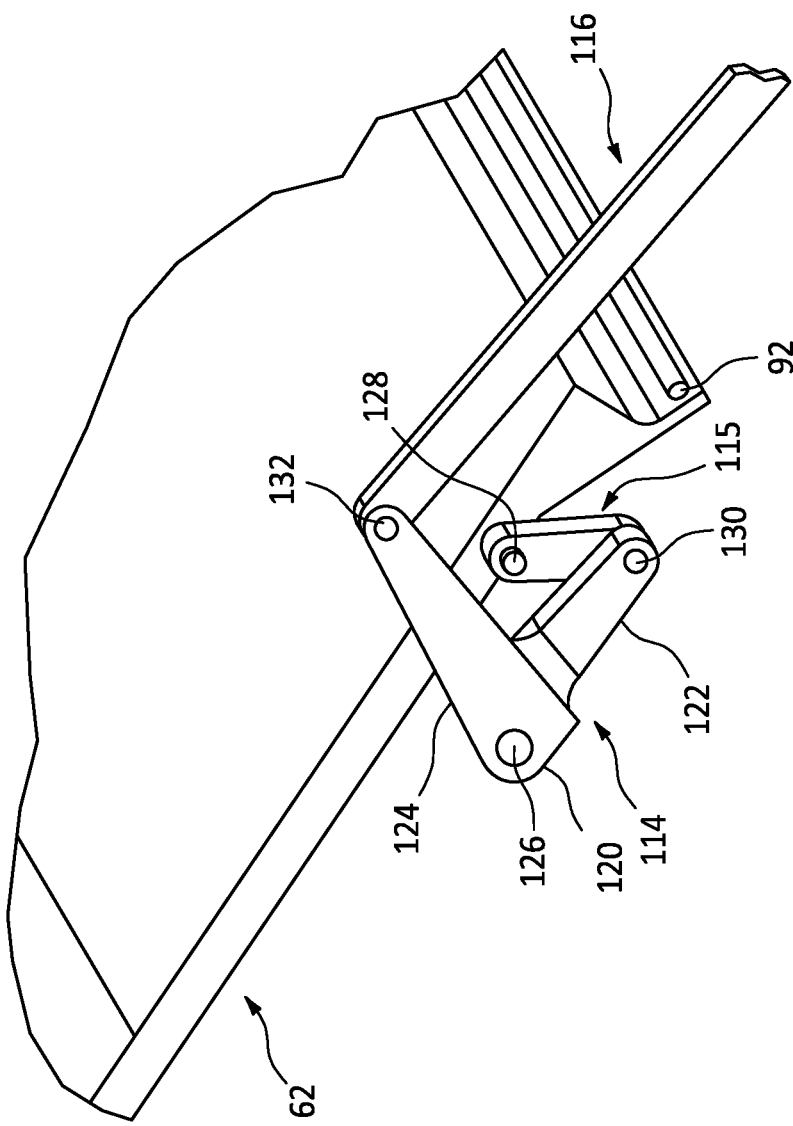
FIG. 6 is a perspective illustration of a portion of the actuator assembly at a connection with a nozzle outer door.

The outer cranks 114 of FIG. 5 are arranged on opposing transverse (e.g., generally circumferential) sides of a respective one of the nozzle outer doors 62. Referring to FIG. 6, each outer crank 114 includes an outer crank base 120, an outer crank first arm 122 and an outer crank second arm 124. Referring to FIGS. 2 and 3, the outer crank base 120 is pivotally connected to the base structure 60 and its structure forward section 82 by a pivot connection 126; e.g., a hinge connection, a pin connection, etc. Referring again to FIG. 6, each of the outer crank arms 122 and 124 projects longitudinally out from the outer crank base 120 to a respective distal end. These outer crank arms 122 and 124 are angularly offset from one another about the outer crank base 120 and its pivot axis by an included angle; e.g., an acute angle.

The outer linkages 115 of FIG. 5 are arranged on opposing transverse (e.g., generally circumferential) sides of the respective nozzle outer door 62. Referring to FIG. 6, each outer linkage 115 may be configured as a fixed length link; e.g., a push rod, a strut, etc. Of course, in other embodiments, a length of each outer linkage 115 may be adjustable, but fixed during operation. Each outer linkage 115 extends longitudinally between and to an outer end of the respective outer linkage 115 and an inner end of the respective outer linkage 115. Each outer linkage 115 is pivotally connected to the respective nozzle outer door 62 by a pivot connection 128 (e.g., a hinge connection, a pin connection, etc.) at the outer linkage outer end and at or about the outer door aft end 92. Each outer linkage 115 is pivotally connected to a respective one of the outer cranks 114. The outer linkage 115 of FIG. 6, for example, is pivotally connected to the outer crank first arm 122 of the respective outer crank 114 through a pivot connection 130 (e.g., a hinge connection, a pin connection, etc.) at the outer linkage inner end and at the first arm distal end.

The intermediate linkages 116 of FIG. 5 are arranged on opposing transverse (e.g., generally circumferential) sides of the respective nozzle doors 62 and 63. Each intermediate linkage 116 may be configured as a fixed length link; e.g., a push rod, a strut, etc. Of course, in other embodiments, a length of each intermediate linkage 116 may be adjustable, but fixed during operation. Each intermediate linkage 116 extends longitudinally between and to an outer end of the respective intermediate linkage 116 and an inner end of the respective intermediate linkage 116. Referring to FIG. 6, each intermediate linkage 116 is pivotally connected to a respective one of the outer cranks 114. The intermediate linkage 116 of FIG. 6, for example, is pivotally connected to the outer crank second arm 124 of the respective outer crank 114 through a pivot connection 132 (e.g., a hinge connection, a pin connection, etc.) at the intermediate linkage outer end and the second arm distal end.

Figure 7:
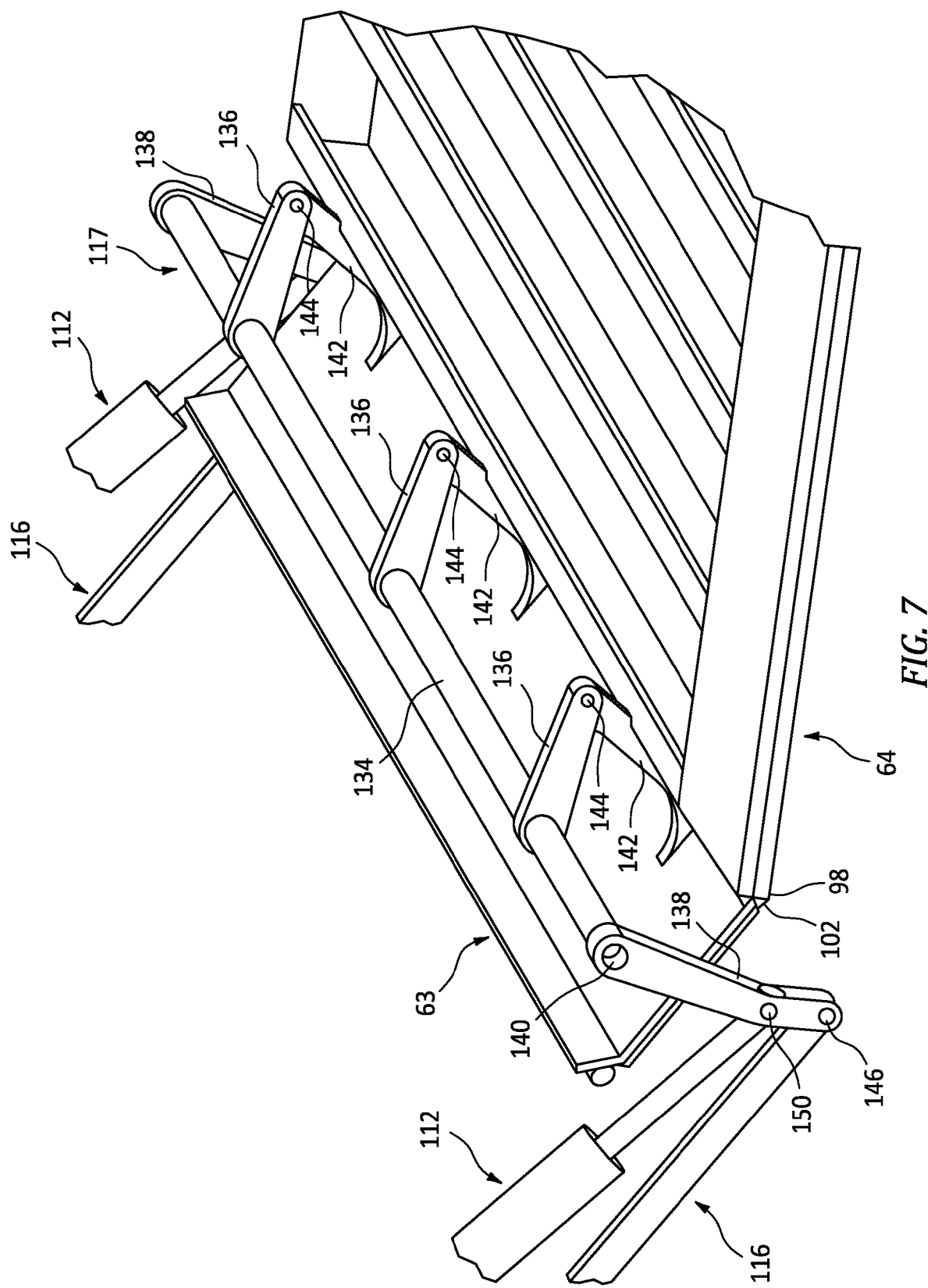
FIG. 7 is a perspective illustration of a portion of the actuator assembly at a connection between a set of nozzle inner doors.
Figure 8C:
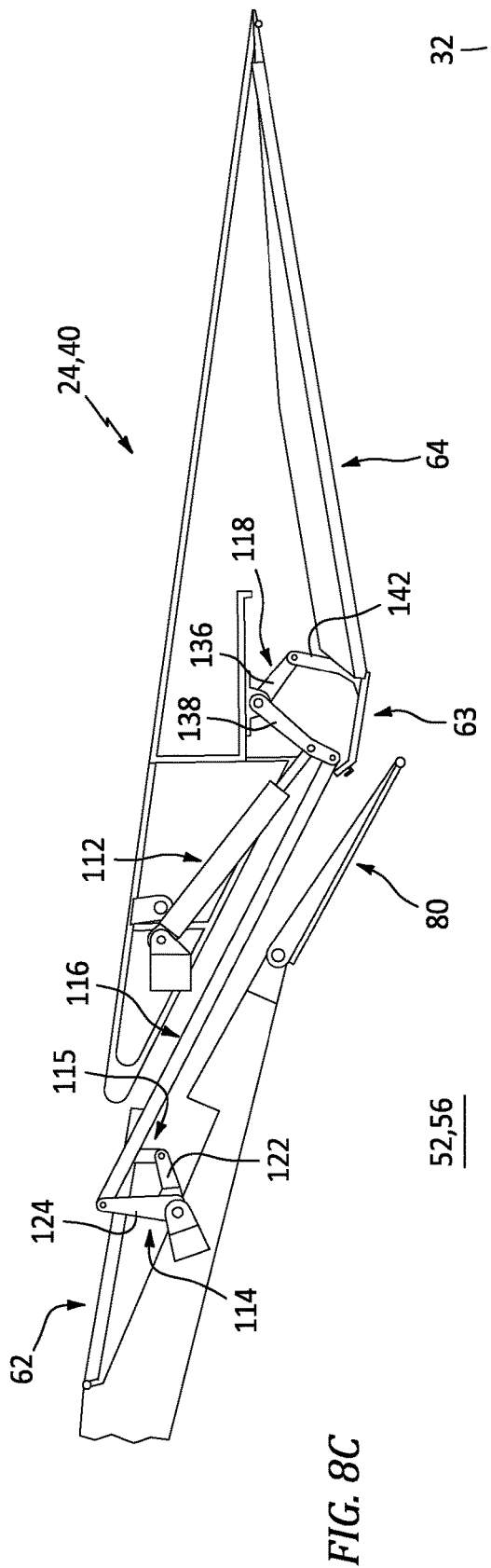
Figure 8D:
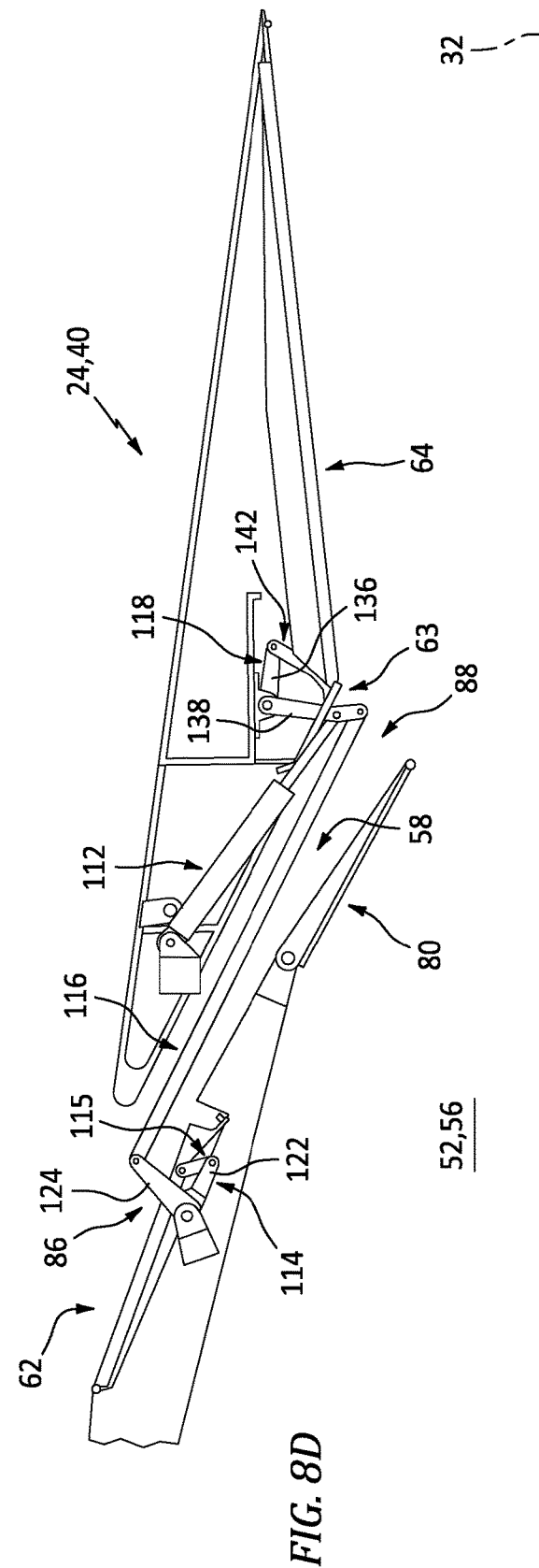

Referring to FIG. 7, the inner crank 117 includes an inner crank base 134, one or more inner crank first arms 136 and one or more inner crank second arms 138. Referring to FIGS. 2 and 3, the inner crank base 134 is pivotally connected to the base structure 60 and its structure aft section 84 by a pivot connection 140; e.g., a hinge connection, a pin connection, etc. Referring to again to FIG. 7, each of the inner crank arms 136 and 138 projects longitudinally out from the inner crank base 134 to a respective distal end. These inner crank arms 136 and 138 are angularly offset from one another about the inner crank base 134 and its pivot axis by an included angle; e.g., an acute angle. Each inner crank first arm 136 is pivotally connected to a respective one of the nozzle forward inner doors 63. Each inner crank first arm 136 of FIG. 7, for example, is pivotally connected to a respective mount 142 of the respective nozzle forward inner door 63 through a pivot connection 144 (e.g., a hinge connection, a pin connection, etc.) at its first arm distal end and at a distal end of the mount 142, where the mount 142 of FIG. 7 is configured as a lever arm projecting out from a base panel of the respective nozzle forward inner door 63 to its distal end. Each inner crank second arm 138 is pivotally connected to a respective one of the intermediate linkages 116 through a pivot connection 146 (e.g., a hinge connection, a pin connection, etc.) at its second arm distal end and at the intermediate linkage inner end.

The actuators 112 of FIG. 5 are arranged on opposing transverse (e.g., generally circumferentially) sides of the respective nozzle doors 62 and 63. Each actuator 112 may be configured as a linear actuator such as, but not limited to, a hydraulic cylinder. Each actuator 112 of FIG. 5 extends longitudinally between and to an outer end of the respective actuator 112 and an inner end of the respective actuator 112. Referring to FIGS. 2 and 3, each actuator 112 is pivotally connected to the base structure 60 and its structure aft section 84 through a pivot connection 148 (e.g., a hinge connection, a pin connection, etc.) at the actuator outer end. Referring to FIG. 7, each actuator 112 is pivotally connected to the inner crank 117. More particularly, each actuator 112 is pivotally connected to a respective one of the inner crank second arms 138 by a pivot connection 150 (e.g., a hinge connection, a pin connection, etc.) proximate the respective second arm distal end; e.g., next to, but slightly radially outboard of the respective pivot connection 146. With this arrangement, referring to FIG. 5, each set of the nozzle doors 62-64 may be actuated/moved by the same one or more actuators 112 since (i) the inner crank 117 motively couples each actuator 112 to the respective nozzle inner doors 63 and 64 and (ii) the components 114-117 motively couple each actuator 112 to the respective nozzle outer door 62.

FIGS. 8A-D illustrate a sequence of the exhaust nozzle 40 moving from its first arrangement/first mode of operation to its second arrangement/second mode of operation to open the ejector passages 58. During this movement, the actuators 112 longitudinally extend and thereby rotate the inner crank second arms 138 axially aft and rotate the inner crank first arms 136 laterally outward. Movement of the inner crank first arms 136 pulls the mounts 142 laterally outward and axially aft, which causes the respective nozzle forward inner door 63 to move and pivot laterally outward. Movement of the nozzle forward inner door 63 causes the respective nozzle aft inner door 64 to move and pivot laterally outward. Movement of the inner crank second arms 138 pulls the intermediate linkages 116 laterally inwards and axially aft, which causes the outer crank second arms 124 to rotate axially aft and the outer crank first arms 122 to rotate laterally inwards. Movement of the outer crank first arms 122 pull the outer linkages 115 laterally inward, which causes the respective nozzle outer door 62 to pivot laterally inward. The movement of the nozzle doors 62 and 64 respectively opens the respective ejector passage orifices 86 and 88 (see FIG. 8D).

The actuator assemblies 108 of FIG. 5 are described above with a plurality of each of the components 114-116. However, in other embodiments, one or more or all of the actuator assemblies 108 may each be configured with a single one of each of the components 114-116, where those components 114-116 are arranged transversely (e.g., generally circumferentially) midway along the respective nozzle outer door 62 and the respective nozzle forward inner door 63.

In some embodiments, referring to FIGS. 2 and 3, the bottom half of the exhaust nozzle 40 may be configured as a mirror image of the top half of the exhaust nozzle 40. However, in other embodiments, the bottom half of the exhaust nozzle 40 may have a different configuration than the top half of the exhaust nozzle 40.

The exhaust nozzle 40 is shown in FIG. 4 with a polygonal (e.g., rectangular) tubular body. However, in other embodiments, it is contemplated the exhaust nozzle 40 may have alternative body geometries.

In some embodiments, one or more or all of the nozzle doors 62-64 may each be configured with a seal element or seal elements along a portion or an entirety of a perimeter of that door 62, 63, 64. The seal element(s) may be configured as a pressure seal element and/or an aerodynamic seal element. For example, each of the nozzle outer doors 62 may be configured with a pressure seal element. Each of the nozzle inner doors may be configured with an aerodynamic seal element.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
an exhaust nozzle including a flowpath, a passage, an outer door, an inner door and an actuator configured to move the outer door and the inner door between an open arrangement and a closed arrangement;
the flowpath extending axially along a centerline through the exhaust nozzle;
the passage extending laterally into the exhaust nozzle to the flowpath when the outer door and the inner door are in the open arrangement;
the outer door configured to pivot inwards towards the centerline when the outer door moves from the closed arrangement to the open arrangement; and
the inner door configured to pivot outwards away from the centerline when the inner door moves from the closed arrangement to the open arrangement;
wherein the outer door closes an inlet to the passage when the outer door is in the closed arrangement; and
wherein the inner door closes an outlet from the passage when the inner door is in the closed arrangement.

2. The apparatus of claim 1, wherein the exhaust nozzle comprises a convergent-divergent nozzle.

3. The apparatus of claim 1, wherein the exhaust nozzle comprises an ejector nozzle.

4. The apparatus of claim 1, wherein the actuator comprises a linear actuator.

5. The apparatus of claim 1, wherein the exhaust nozzle further includes a linkage system motively coupling the actuator to the outer door and the inner door.

6. The apparatus of claim 5, wherein the linkage system comprises a pushrod.

7. The apparatus of claim 5, wherein the linkage system comprises a crank.

8. The apparatus of claim 1, wherein
the exhaust nozzle further includes a base structure, an outer crank and an outer linkage;
the outer crank includes an outer crank base, an outer crank first arm and an outer crank second arm, the outer crank base is pivotally connected to the base structure, and the outer crank first arm and the outer crank second arm each project out from the outer crank base;
the outer linkage is between and pivotally connected to the outer crank first arm and the outer door; and
the actuator is motively coupled with the outer crank second arm.

9. The apparatus of claim 1, wherein
the exhaust nozzle further includes a base structure and an inner crank;
the inner crank includes an inner crank base, an inner crank first arm and an inner crank second arm, the inner crank base is pivotally connected to the base structure, the inner crank first arm projects out from the base and is pivotally connected to the inner door, and the inner crank second arm projects out from the base and is pivotally connected to the actuator.

10. The apparatus of claim 9, wherein
the exhaust nozzle further includes an outer crank, an outer linkage and an intermediate linkage;
the outer crank includes an outer crank base, an outer crank first arm and an outer crank second arm, the outer crank base is pivotally connected to the base structure, and the outer crank first arm and the outer crank second arm each project out from the outer crank base;
the outer linkage is between and pivotally connected to the outer crank first arm and the outer door; and
the intermediate linkage is between and pivotally connected to the outer crank second arm and the inner crank second arm.

11. The apparatus of claim 1, wherein
the inner door comprises a forward inner door, and the exhaust nozzle further includes an aft inner door pivotally connected to the forward inner door;
the actuator is further configured to move the aft inner door between the open arrangement and the closed arrangement; and
the aft inner door is configured to pivot outwards away from the centerline when the aft inner door moves from the closed arrangement to the open arrangement.

12. The apparatus of claim 11, wherein at least one of
the outer door forms an inner peripheral boundary for flow outside of the exhaust nozzle when the outer door is in the closed arrangement; or
the forward inner door and the aft inner door form an outer peripheral boundary of the flowpath when the forward inner door and the aft inner door are in the closed arrangement.

13. An apparatus for an aircraft propulsion system, comprising:
an exhaust nozzle including a flowpath, a passage, an outer door, an inner door and an actuator configured to move the outer door and the inner door between an open arrangement and a closed arrangement;

the flowpath extending axially along a centerline through the exhaust nozzle;

the passage extending laterally into the exhaust nozzle to the flowpath when the outer door and the inner door are in the open arrangement;

the outer door comprising a forward end and an aft end defined when the outer door is in the closed arrangement, the aft end of the outer door configured to pivot inwards towards the centerline when the outer door moves from the closed arrangement to the open arrangement;

the inner door configured to pivot outwards away from the centerline when the inner door moves from the closed arrangement to the open arrangement; and the outer door configured to pivot between the closed arrangement and the open arrangement about an outer door pivot connection at a forward end of the outer door.

14. The apparatus of claim 13, wherein the exhaust nozzle comprises a convergent-divergent nozzle.

15. The apparatus of claim 13, wherein the exhaust nozzle comprises an ejector nozzle.

16. The apparatus of claim 13, wherein the actuator comprises a linear actuator.

17. The apparatus of claim 13, wherein the exhaust nozzle further includes a linkage system motively coupling the actuator to the outer door and the inner door.

18. An apparatus for an aircraft propulsion system, comprising:

an exhaust nozzle including a flowpath, a passage, an outer door, an inner door and an actuator configured to move the outer door and the inner door between an open arrangement and a closed arrangement;

the flowpath extending axially along a centerline through the exhaust nozzle; the passage extending laterally into the exhaust nozzle to the flowpath when the outer door and the inner door are in the open arrangement;

the outer door configured to pivot inwards towards the centerline when the outer door moves from the closed arrangement to the open arrangement;

a forward end of the inner door configured to pivot outwards away from the centerline when the inner door moves from the closed arrangement to the open arrangement; and the inner door configured to pivot between the closed arrangement and the open arrangement about an inner door pivot connection at an aft end of the inner door.

19. The apparatus of claim 18, wherein the exhaust nozzle comprises a convergent-divergent nozzle.

20. The apparatus of claim 18, wherein the exhaust nozzle comprises an ejector nozzle.

* * * * *